United States Patent [19]
Dunbar et al.

[11] Patent Number: 5,259,187
[45] Date of Patent: Nov. 9, 1993

[54] METHOD OF OPERATING AN AIRCRAFT BYPASS TURBOFAN ENGINE HAVING VARIABLE FAN OUTLET GUIDE VANES

[75] Inventors: Donald K. Dunbar, Sharonville; Paul J. Hess, Cincinnati; Bobby R. Delaney, Loveland, all of Ohio

[73] Assignee: General Electric Company, Cincinnati, Ohio

[21] Appl. No.: 14,030

[22] Filed: Feb. 5, 1993

[51] Int. Cl.⁵ .................................................. F02K 3/06
[52] U.S. Cl. ...................................... 60/204; 60/226.3
[58] Field of Search ................. 60/204, 226.1, 226.3, 60/262, 263, 39.091; 415/119, 160, 161, 144, 145

[56] References Cited

U.S. PATENT DOCUMENTS

| | | | |
|---|---|---|---|
| 3,227,176 | 1/1966 | Luebering et al. | 415/123 |
| 3,449,914 | 6/1969 | Brown | 60/226.3 |
| 3,779,665 | 12/1973 | Tatem, Jr. et al. | 415/123 |
| 4,043,121 | 8/1977 | Thomas et al. | 60/204 |
| 4,064,692 | 12/1977 | Johnson et al. | 60/261 |
| 4,185,457 | 1/1980 | Parker et al. | 60/204 |
| 4,221,114 | 9/1980 | Wilde et al. | 60/262 |
| 4,275,560 | 6/1981 | Wright et al. | 60/226.3 |
| 4,292,802 | 10/1981 | Snow | 60/226.3 |

OTHER PUBLICATIONS

"TF34 Convertible Engine System Technology Program Engine Design and Test Report", May 1983, by GE for NASA Contract NAS3-22752 vol. I—cover page; pp. 2, 15, 20-22 and 83-86 vol. II—cover page; pp. 20-21.

Concurrently filed U.S. patent application entitled "Aircraft Bypass Turbofan Engine Thrust Reverser" by Donald K. Dunbar et al.

Primary Examiner—Louis J. Casaregola
Attorney, Agent, or Firm—Douglas E. Erickson; Jerome C. Squillaro

[57] ABSTRACT

A method of operating an aircraft bypass turbofan engine having variable fan outlet guide vanes. In a first embodiment, an engine out condition is sensed, fan rotor speed is repeatedly measured, and vane pitch is adjusted to a predetermined value as a function of the fan rotor speed to generally maximize airflow through the vanes during the engine out condition. In a second embodiment, vane pitch is adjusted to a preselected value as a function of fan rotor speed to generally minimize engine noise during a noise reduction mode of engine operation.

3 Claims, 2 Drawing Sheets

1

METHOD OF OPERATING AN AIRCRAFT BYPASS TURBOFAN ENGINE HAVING VARIABLE FAN OUTLET GUIDE VANES

BACKGROUND OF THE INVENTION

The present invention relates generally to a type of gas turbine engine known as an aircraft bypass turbofan engine, and more particularly to a method of operating the engine for an engine out condition and for engine noise reduction.

A gas turbine engine includes a core engine having a high pressure compressor to compress the air flow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical aircraft bypass turbofan engine adds a low pressure turbine (located aft of the high pressure turbine) which is connected by a smaller diameter coaxial shaft to drive a front fan (located forward of the high pressure compressor) which is surrounded by a fan nacelle and which may also drive a low pressure compressor (located between the front fan and the high pressure compressor). The low pressure compressor sometimes is called a booster compressor or simply a booster. A flow splitter, located between the fan and the first (usually the low pressure) compressor, separates the air which exits the fan into a core engine airflow and a surrounding bypass airflow. The bypass airflow from the fan exits the fan nozzle (also called the fan bypass nozzle or the fan exhaust nozzle) to provide most of the engine thrust (for the case of a high bypass engine) for the aircraft. Some of the engine thrust comes from the core engine airflow after it flows through the low and high pressure compressors to the combustor and is expanded through the high and low pressure turbines and accelerated out of the core nozzle (also called the core exhaust nozzle). A core nacelle surrounds the low and high pressure compressors and turbines and the intervening combustor.

Known aircraft bypass turbofan engine designs include those having a row of variable-pitch (e.g., pivoting) fan outlet guide vanes radially located between the fan and core nacelles and longitudinally located aft of the flow splitter wherein it has been reported that the vane incidence angle is controlled to reduce losses, improve fan bypass efficiency and increase fan bypass stall margin. What is needed is a method to more efficiently operate such an engine.

SUMMARY OF THE INVENTION

It is an object of the invention to provide a method of operating an aircraft bypass turbofan engine having variable fan outlet guide vanes for an engine out condition and for engine noise reduction.

The invention provides a method of operating an aircraft bypass turbofan engine wherein the engine includes a longitudinally aft-most row of generally radially outwardly extending fan rotor blades, a core nacelle located aft of the blades and having a forward end defining a flow splitter, a fan nacelle surrounding the blades and at least part of the core nacelle, and a row of variable-pitch fan outlet guide vanes radially located between the fan and core nacelles and positioned aft of the flow splitter. The method includes sensing an engine out condition, repeatedly measuring fan rotor speed, and adjusting the pitch of the vanes to a predetermined value as a function of the current fan rotor speed measurement to generally maximize airflow through the vanes during the engine out condition.

The invention also provides a method of operating the same engine described in the previous paragraph including the steps of repeatedly measuring fan rotor speed, adjusting the pitch of the vanes to a preselected value as a function of the current fan rotor speed measurement to generally minimize engine noise during a noise reduction mode of engine operation, and adjusting the pitch of the vanes to a preestablished value as a function of the current fan rotor speed measurement during a mode (e.g., cruise) of engine operation different from the noise reduction mode wherein the preselected value is different from the preestablished value for an identical fan rotor speed measurement.

Several benefits and advantages are derived from the method of engine operation of the invention, especially on multi-engine aircraft. Maximizing airflow through the vanes during an engine out condition reduces engine internal drag and nacelle (spillage) drag and prevents inlet upper external lip airflow separation during a high angle of attack takeoff, such unwanted separation increasing inlet drag and decreasing wing lift. Since current engine design incorporates a larger and heavier fan nacelle designed for the drag and separation of an engine out condition and since current aircraft design incorporates a larger and heavier tail designed to control yaw caused by increased drag for an engine out condition, significant increases in specific fuel consumption can be achieved with the method of the present invention which allows for smaller engine nacelles and aircraft tails whereby the operating engines can safely fly a multi-engine aircraft during an engine out condition. Adjusting vane pitch to minimize engine noise based on fan rotor speed will help aircraft meet noise regulations, such as during aircraft descent. Adjusting vane pitch to reduce drag and increase thrust based on fan rotor speed will help aircraft increase engine performance when engine noise is not a problem such as during high altitude cruise.

BRIEF DESCRIPTION OF THE DRAWINGS

The accompanying drawings illustrate a preferred embodiment of the present invention wherein.

DETAILED DESCRIPTION OF THE INVENTION

Figure 1:
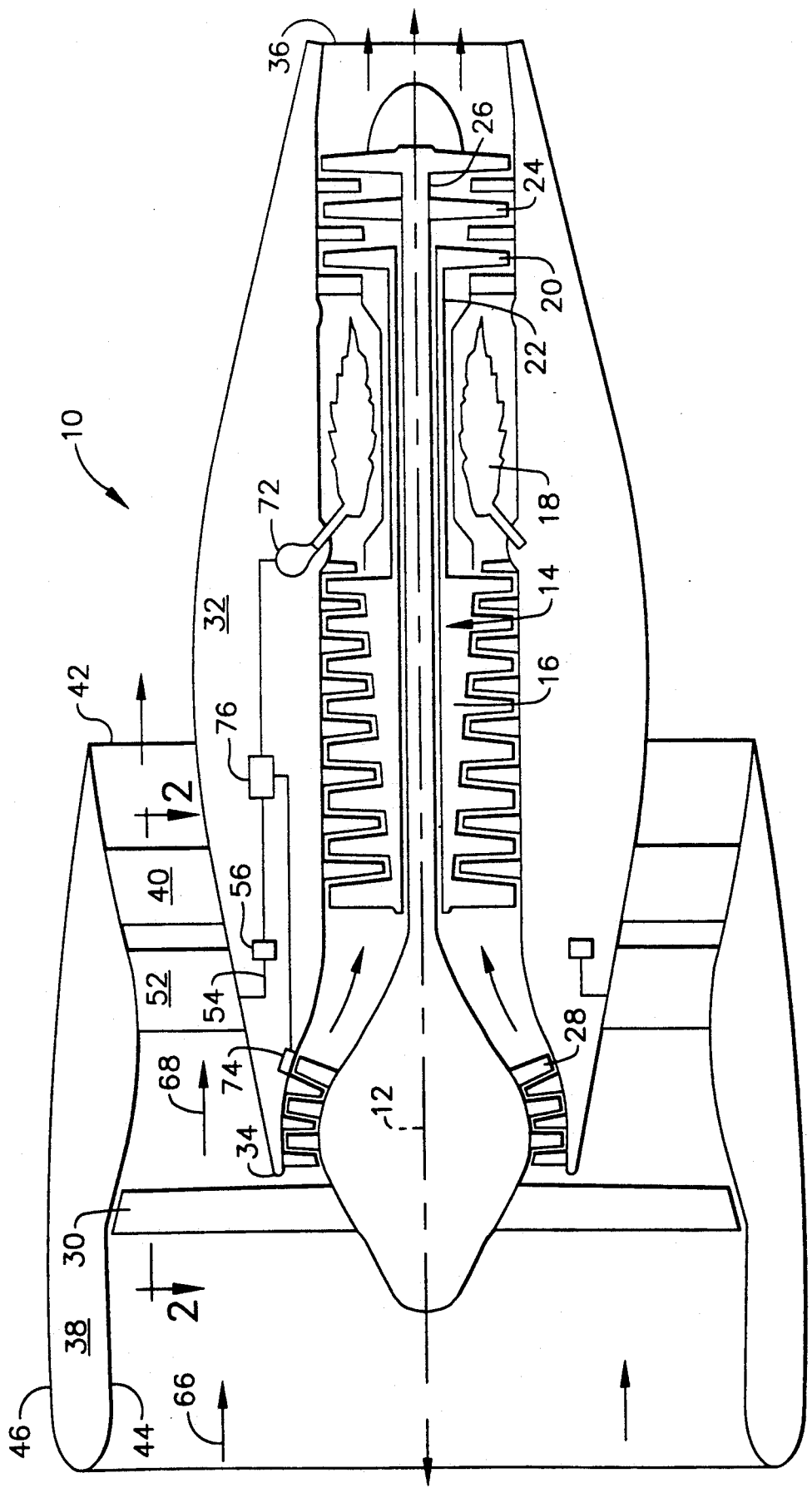
FIG. 1 is a schematic cross-sectional side view of an aircraft bypass turbofan engine.

Referring now to the drawings, and particularly to FIG. 1, there is illustrated generally an aircraft bypass turbofan engine 10 having a generally longitudinally extending axis or centerline 12 extending forward and aft. It is noted that unnumbered arrows (and numbered arrows if so described) indicate the direction of airflow (or gas flow) through the engine 10. The bypass turbofan engine 10 includes a core engine (also called a gas generator) 14 which comprises a high pressure compressor 16, a combustor 18, and a high pressure turbine 20, all arranged in a serial, axial flow relationship. A larger diameter annular drive shaft 22, disposed coaxially about the centerline 12 of the engine 10, fixedly interconnects the high pressure compressor 16 and the high pressure turbine 20.

The core engine 14 is effective for generating combustion gases. Pressurized air from the high pressure compressor 16 is mixed with fuel in the combustor 18 and ignited, thereby generating combustion gases. Some work is extracted from these gases by the high pressure turbine 20 which drives the high pressure compressor 16. The remainder of the combustion gases are discharged from the core engine 14 into a low pressure or power turbine 24. The low pressure turbine 24 is fixedly attached to a smaller diameter annular drive shaft 26 which is disposed coaxially about the centerline 12 of the engine 10 within the larger diameter annular drive shaft 22. The smaller diameter annular drive shaft 26 rotates an interconnected low pressure compressor (also called a booster or booster compressor) 28 and a fan including a longitudinally aft-most row of generally radially outwardly extending fan rotor blades 30. Preferably, the blades 30 are fixed-pitch blades 30. Although only one row of fan rotor blades 30 is shown in FIG. 1, a particular engine design may have additional rows of fan rotor blades with associated intervening rows of fan stator vanes (also called fan guide vanes).

The core engine 14, low pressure turbine 24, and low pressure compressor 28 are surrounded by a casing or core nacelle 32 which supports the drive shafts 22 and 26 by bearings (not shown). The core nacelle 32 is disposed longitudinally aft of the blades 30 and has a longitudinally forward end defining a flow splitter 34 and a longitudinally aft end defining a core nozzle 36.

A fan nacelle 38 circumferentially surrounds the blades 30 and at least a portion of the core nacelle 32. The fan nacelle 38 is supported about the core nacelle 32 by a plurality of support members 40, such as fan frame struts 40 or stationary (i.e., non-rotating) structural fan outlet guide vanes, only two of which are shown in FIG. 1. It is noted that blades and vanes have cambered airfoil shapes while struts do not. The fan nacelle 38 has a longitudinally aft end defining a fan nozzle 42, an inner exterior surface 44 facing generally radially inward, and an outer exterior surface 46 facing generally radially outward. It is noted that in some designs, the fan nozzle 42 may be eliminated with the bypass air being ducted to mix with the core exhaust in a "mixed-flow" type of exhaust nozzle.

A row of variable-pitch fan outlet guide vanes 52 is radially disposed between the fan and core nacelles 38 and 32 and longitudinally disposed aft of the flow splitter 34. Preferably, the row of vanes 52 is the nearest row of airfoils to the blades 30 longitudinally aft and radially outward of the flow splitter 34. Preferably, the vanes 52 are pivotable vanes although vane pitch could be varied by having only the vane leading edge or vane trailing edge pivotable or by otherwise varying the effective angle of incidence of the vanes, as is known to those skilled in the art.

Means are provided for varying the vane pitch such as by pivoting the pivotable vanes 52. Preferably such vane-pivoting or vane-turning means include a lever arm 54 connected to the pivotable vanes 52. In an exemplary embodiment, the lever arm 54 is actuated by a unison ring 56. Other such vane-pivoting means include various mechanical and electro-mechanical devices, as is known to those skilled in the art.

Figure 2:
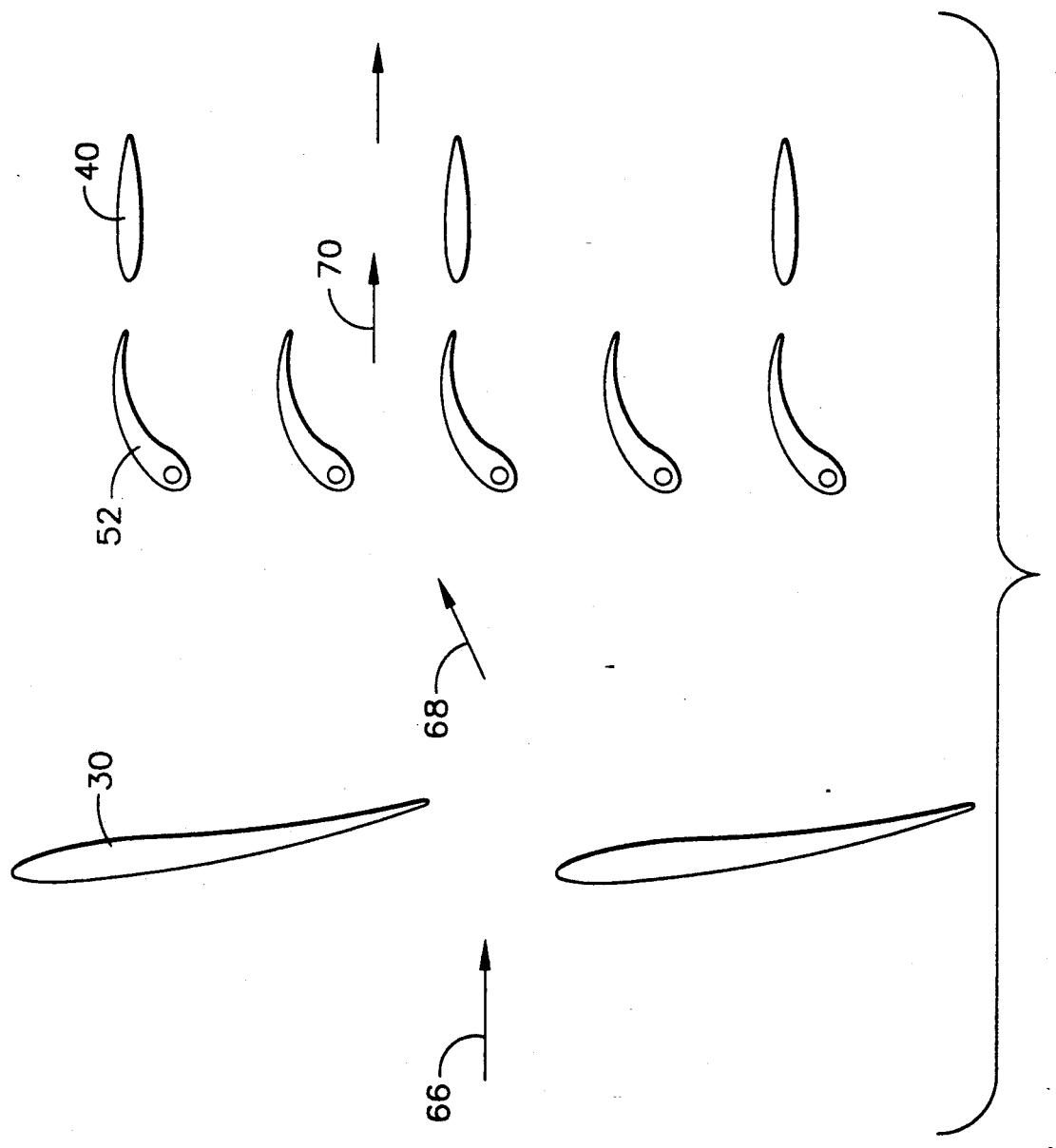
FIG. 2 is a schematic top view taken along lines 2—2 of FIG. 1 showing the variable-pitch fan outlet guide vanes set to a particular pitch value.

During cruise, the vanes 52 would be pivoted to reduce the swirl angle of the bypass air discharged from the blades 30 (i.e., the blade swirl angle). The blade swirl angle depends on the rotational speed of the blades 30 which varies during flight. The swirl angle is the angle of the bypass air (i.e., the air flowing radially between the core and fan nacelles 32 and 38) relative to the engine's longitudinal axis 12. Engine drag is reduced and engine thrust is increased if the swirl angle is zero at the fan nozzle 42. FIG. 2 shows longitudinally directed ambient air 66 entering the area of the blades 30 and exiting therefrom with an airflow direction 68 corresponding to a large blade swirl angle, such air then entering the area of the vanes 52 which turn the airflow such that air exits the vanes 52 with an airflow direction 70 corresponding to a small (essentially zero) vane swirl angle. Such vanes 52 would be pivoted during, for example, cruise to adjust to a varying blade swirl angle (which is a function of the fan rotor speed) to reduce the swirl angle of the bypass air at the fan nozzle 42 and thus decrease drag and increase thrust to improve engine efficiency.

An engine out condition can be detected by a sensor such as a zero fuel flow sensor 72 located, for example, near the combustor 18. Other such sensors include a combustor or high pressure turbine temperature sensor wherein a low temperature indicates an engine out condition. Fan rotor speed can be measured by an electromagnetic or optical pick-up device 74 located proximate the blade tips of the booster or low pressure compressor 28. Such device 74 could also be located proximate the tips of the fan blades 30 or near the fan shaft 26. Such temperature and fuel flow sensors and rotor speed measuring devices are presently used in conventional jet engines. An electronic engine controller 76 may be used to receive inputs from the engine out (e.g., fuel flow) sensor 72 and from the fan speed measurement device 74 and to direct outputs to the actuators of the unison ring 56 to vary the pitch of the adjustable-pitch vanes 52.

A first embodiment of the method of the invention includes sensing an engine out condition (via sensor 72) for the engine 10, repeatedly measuring fan rotor speed (via sensor 74) during the engine out condition, and adjusting the pitch of the vanes 52 to a predetermined value as a function of the current fan rotor speed measurement to generally maximize airflow through the vanes during the engine out condition. The value of the pitch of the vanes 52, which maximizes airflow therethrough, is a function of the fan rotor speed and can be predetermined by analytical calculations or by empirical measurements. Analytical calculations could employ computers and empirical measurements could employ ground tests or flight tests. Such analytical calculations and empirical measurements are all within the purview of those skilled in the art.

A second embodiment of the method of the invention includes repeatedly measuring fan rotor speed, adjusting the pitch of the vanes to a preselected value as a function of the current fan rotor speed measurement to generally minimize engine noise during a noise reduction mode of engine operation, and adjusting the pitch of the vanes to a preestablished value as a function of the current fan rotor speed measurement during a mode of engine operation (such as cruise) different from the noise reduction mode, wherein the preselected value is different from the preestablished value for an identical fan rotor speed measurement (as can be determined by those skilled in the art). The value of the pitch of the vanes 52, which minimizes engine noise for a noise reduction mode of engine operation is a function of the fan rotor speed and can be preselected by analytical calculations or by empirical measurements in a manner similar to that discussed for the first embodiment in the previous paragraph. Likewise, the value of the pitch of the vanes 52 which, for example, minimizes drag and maximizes thrust for optimal engine performance during a cruise mode of engine operation is a function of the fan rotor speed and can be preestablished by analytical calculations or by empirical measurements in a manner similar to that discussed in the paragraph above.

In an exemplary embodiment of the invention, the fan nacelle 38 has a through passageway with a terminus located on the generally radially inwardly facing inner exterior surface of the nacelle, with such terminus disposed longitudinally aft of the blades 30. The vanes 52 are pivotable and are located longitudinally aft of the passageway terminus. Means are provided for pivoting the vanes such that for ground deceleration the vanes generally block airflow therethrough. Means are also provided for opening the passageway for ground deceleration and for closing the passageway. Preferably the passageway is a thrust reverser passageway. In an exemplary method of operating the engine 10, the passageway would be opened and the vanes pivoted to block flow therethrough for ground deceleration. The term "deceleration" means a negative acceleration such as, but not limited to, slowing down a forward-moving aircraft on the runway or backing an aircraft away from the airport departure gate.

The foregoing description of the invention has been presented for purposes of illustration. It is not intended to be exhaustive or to limit the invention to the precise form disclosed. For example, the pitch of the vanes 52 may be changed by telescoping or sliding the vane leading or trailing edge or by otherwise changing the size or configuration of the vane. Obviously many modifications and variations are possible in light of the above teachings all of which are within the scope of the claims appended hereto.

We claim:

1. A method of operating an aircraft bypass turbofan engine, said engine including: a generally longitudinally extending axis extending forward and aft; a longitudinally aft-most row of generally radially outwardly extending fan rotor blades; a core nacelle disposed longitudinally aft of said blades and having a longitudinally forward end defining a flow splitter; a fan nacelle circumferentially surrounding said blades and at least a portion of said core nacelle; and a row of variable-pitch fan outlet guide vanes radially disposed between said fan and core nacelles and longitudinally disposed aft of said flow splitter, and said method comprising the steps of:
    (a) sensing an engine out condition for said engine;
    (b) repeatedly measuring fan rotor speed during said engine out condition; and
    (c) adjusting the pitch of said vanes to a predetermined value as a function of the current fan rotor speed measurement to generally maximize airflow through said vanes during said engine out condition.

2. A method of operating an aircraft bypass turbofan engine, said engine including: a generally longitudinally extending axis extending forward and aft; a longitudinally aft-most row of generally radially outwardly extending fan rotor blades; a core nacelle disposed longitudinally aft of said blades and having a longitudinally forward end defining a flow splitter; a fan nacelle circumferentially surrounding said blades and at least a portion of said core nacelle; and a row of variable-pitch fan outlet guide vanes radially disposed between said fan and core nacelles and longitudinally disposed aft of said flow splitter, and said method comprising the steps of:
    (a) repeatedly measuring fan rotor speed;
    (b) adjusting the pitch of said vanes to a preselected value as a function of the current fan rotor speed measurement to generally minimize engine noise during a noise reduction mode of engine operation, and
    (c) adjusting the pitch of said vanes to a preestablished value as a function of the current fan rotor speed measurement during a mode of engine operation different from said noise reduction mode, wherein said preselected value is different from said preestablished value for an identical fan rotor speed measurement.

3. The method of claim 2, also including the steps of sensing an engine out condition for said engine and adjusting the pitch of said vanes to a predetermined value as a function of the current fan rotor speed measurement to generally maximize airflow through said vanes during an engine out condition.

* * * * *